(12) United States Patent
Hsieh

(10) Patent No.: US 10,124,428 B2
(45) Date of Patent: Nov. 13, 2018

(54) HORIZONTAL SAWING MACHINE

(71) Applicant: LEE YEONG INDUSTRIAL CO., LTD., Douliu, Yunlin County (TW)

(72) Inventor: Pan-Chung Hsieh, Yunlin County (TW)

(73) Assignee: Lee Yeong Industrial Co., Ltd., Douliu, Yunlin County (TW)

( * ) Notice: Subject to any disclaimer, the term of this patent is extended or adjusted under 35 U.S.C. 154(b) by 0 days.

(21) Appl. No.: 15/644,264

(22) Filed: Jul. 7, 2017

(65) Prior Publication Data

US 2018/0009047 A1  Jan. 11, 2018

(30) Foreign Application Priority Data

Jul. 7, 2016 (TW) .............................. 105210302 U

(51) Int. Cl.
| | |
|---|---|
| *B23D 45/16* | (2006.01) |
| *B23D 45/00* | (2006.01) |
| *B23D 45/02* | (2006.01) |
| *B23D 47/02* | (2006.01) |
| *B27B 5/08* | (2006.01) |
| *B23D 47/12* | (2006.01) |

(52) U.S. Cl.
CPC ........... *B23D 45/16* (2013.01); *B23D 45/003* (2013.01); *B23D 45/006* (2013.01); *B23D 45/021* (2013.01); *B23D 47/02* (2013.01); *B23D 47/12* (2013.01); *B27B 5/08* (2013.01)

(58) Field of Classification Search
CPC ........ B23D 45/16; B23D 47/12; B23D 47/02; B23D 45/006; B23D 45/003; B23D 45/021; B27B 5/08
See application file for complete search history.

(56) References Cited

U.S. PATENT DOCUMENTS

| | | | | |
|---|---|---|---|---|
| 4,007,657 A | * | 2/1977 | Burch ................... | B23D 47/025 83/471.3 |
| 4,467,849 A | * | 8/1984 | Denis .................... | A01G 23/091 144/336 |
| 4,979,307 A | * | 12/1990 | Ste. Marie ........... | B23D 45/003 30/166.3 |
| 5,080,152 A | * | 1/1992 | Collins ................ | B23D 45/021 144/136.95 |
| 5,090,283 A | * | 2/1992 | Noble ................... | B23D 45/021 269/303 |

(Continued)

*Primary Examiner* — Sean Michalski
(74) *Attorney, Agent, or Firm* — Muncy, Geissler, Olds & Lowe, P.C.

(57) ABSTRACT

A horizontal sawing machine includes a support unit, a driving unit, and a sawing unit. The support unit has a slide rail base with two oppositely disposed stationary slide rails. The driving unit has a driving motor, a reducing gear box, and two oppositely disposed movable slide rails. The reducing gear box is connected to the driving motor and has an output shaft. The movable slide rails are provided on the outer periphery of the reducing gear box and are respectively engaged with the stationary slide rails to enable forward and backward movement of the driving unit with respect to the support unit. The sawing unit has a saw blade and a saw blade mount connected between the bottom end of the output shaft and the saw blade so that the saw blade is rotatable by and movable forward and backward along with the driving unit to facilitate operation.

9 Claims, 9 Drawing Sheets

(56) References Cited

U.S. PATENT DOCUMENTS

| | | | | |
|---|---|---|---|---|
| 6,449,852 B1* | 9/2002 | Simantel | .............. | B23D 45/003 144/136.95 |
| 7,373,865 B2* | 5/2008 | Allen | ..................... | B23D 47/04 269/81 |
| 7,757,592 B2* | 7/2010 | Wilson | .................... | B23D 47/02 83/468.4 |
| 8,967,607 B2* | 3/2015 | Ducek | ....................... | B25H 1/02 108/18 |
| 2004/0103771 A1* | 6/2004 | Lin | ...................... | B23D 45/021 83/386 |
| 2008/0168667 A1* | 7/2008 | Spinato | ................ | B23D 45/003 30/391 |
| 2009/0151530 A1* | 6/2009 | Brady | .................. | B23D 45/003 83/483 |
| 2013/0160630 A1* | 6/2013 | Groth | ................... | B23D 45/006 83/743 |
| 2015/0202699 A1* | 7/2015 | Makkonen | ............ | B23D 45/126 30/102 |
| 2017/0028486 A1* | 2/2017 | Harris | .................. | B23D 45/021 |
| 2017/0368618 A1* | 12/2017 | Harris | .................. | B23D 45/006 |
| 2018/0058029 A1* | 3/2018 | Morimoto | ............ | B23D 45/006 |

* cited by examiner

HORIZONTAL SAWING MACHINE

BACKGROUND OF THE INVENTION

1. Technical Field

The present invention relates to sawing machines and more particularly to one that cuts horizontally and features ease of operation.

2. Description of Related Art

To transport a large steel plate on a construction site, it is common practice to solder a plurality of suspension rings to the plate surface, attach the suspension rings to the jib of a crane, and then move the plate to the desired location by operating the crane. Once the steel plate is in place, the suspension rings must be removed from the plate surface in order to carry out subsequent assembly.

Conventionally, the suspension rings are sawed off with a hand saw, which operation, however, is time-consuming and dangerous. Also, an improper operation angle of the hand saw will lead to incomplete removal of the suspension rings such that the residues of the suspension rings compromise the flatness of the plate surface.

BRIEF SUMMARY OF THE INVENTION

The primary objective of the present invention is to provide a horizontal sawing machine that is both easy and safe to operate.

To achieve the above objective, the horizontal sawing machine of the present invention includes a support unit, a driving unit, and a sawing unit. The support unit has a slide rail base and two oppositely disposed stationary slide rails. The slide rail base has a slide channel extending through the top and bottom sides of the slide rail base. The two stationary slide rails are provided on the slide rail base and are located on two opposite lateral sides of the slide channel respectively. The stationary slide rails extend in a direction parallel to the direction in which the slide channel extends. The driving unit has a driving motor, a reducing gear box, and two oppositely disposed movable slide rails. The driving motor lies above the slide rail base of the support unit. The reducing gear box is connected to one end of the driving motor and has an output shaft. The output shaft is in the slide channel of the slide rail base of the support unit. The two movable slide rails are provided on the outer periphery of the reducing gear box and are respectively and slidably engaged with the stationary slide rails of the support unit in order for the driving unit to move forward and backward with respect to the support unit in a reciprocating manner. The sawing unit is provided under the slide rail base of the support unit and has a saw blade mount and a saw blade. The saw blade mount is connected to the output shaft of the reducing gear box of the driving unit, and the saw blade is fixed on the saw blade mount. Thus, the saw blade not only can be driven to rotate by the driving unit, but also can move forward and backward along with the driving unit.

Once the support unit is fixed on the surface of a workpiece, the driving unit can be operated to drive the sawing unit forward and then backward, in order for the saw blade to saw the workpiece.

In the present invention, the horizontal sawing machine further includes a displacement unit. The displacement unit has a displacement motor, a threaded rod, and a threaded tube. The displacement motor is provided in the slide rail base. The threaded rod is provided in the slide channel of the slide rail base and has one end connected to the displacement motor. The threaded tube is threadedly provided on the threaded rod and has one end connected to the reducing gear box of the driving unit. When the displacement motor is activated, the threaded rod drives the threaded tube to move in the axial direction of the threaded rod, in order for the threaded tube to drive the driving unit forward or backward.

In the present invention, the support unit further has a first positioning member, a second positioning member, and a locking screw. The first positioning member is fixed at one end of the slide rail base. One end of the first positioning member is pivotally connected to one end of the second positioning member. The opposite end of the first positioning member has a locking screw hole. The locking screw extends through a through hole in the second positioning member and is threadedly provided in the locking screw hole in the first positioning member. Before sawing begins, the to-be-sawed portion of the workpiece is clamped between and secured in position by the first and the second positioning members. This ensures a stable sawing operation and also enhances the safety of operation by preventing the to-be-sawed portion from flying off when sawing is completed.

In the present invention, the displacement unit further has a first position-limiting switch, a second position-limiting switch, a first position-limiting member, and a second position-limiting member. The first and the second position-limiting switches are oppositely disposed on the slide rail base and are separately and electrically connected to the displacement motor. The first position-limiting member is provided on a lateral side of the reducing gear box, can be displaced in the direction in which the reducing gear box is moved, and has a first position-limiting protuberance. When the driving unit is moved forward to such extent that the first position-limiting protuberance of the first position-limiting member triggers the first position-limiting switch, the displacement motor stops operation immediately, and the driving unit in this state has reached the front dead point. The second position-limiting member is fixed on the opposite lateral side of the reducing gear box and has a second position-limiting protuberance. When the driving unit is moved backward to such extent that the second position-limiting protuberance of the second position-limiting member triggers the second position-limiting switch, the displacement motor stops operation immediately, and the driving unit in this state has reached the rear dead point.

In the present invention, the support unit further has an electromagnet provided on the bottom side of the slide rail base. When supplied with electricity, the electromagnet fixes the slide rail base to the surface of the workpiece to ensure sawing stability.

In the present invention, the top side of the reducing gear box has an adjusting screw hole, and the sawing unit further has an adjusting screw and a knob. The adjusting screw is threadedly provided in the adjusting screw hole of the reducing gear box and is mounted on the top end of the output shaft of the reducing gear box. The knob is mounted on the adjusting screw in order to drive the adjusting screw into rotation. When turned, the knob drives the output shaft of the reducing gear box through the adjusting screw such that the output shaft is moved upward or downward in its axial direction, and the height of the sawing unit is thereby adjusted.

The structure, features, and methods of assembly and use of the horizontal sawing machine of the present invention will be described in more detail below. As a person of ordinary skill in the art would understand, the detailed description and the specific embodiments provided herein serve illustrative purposes only and are not intended to be restrictive of the scope of the invention.

DETAILED DESCRIPTION OF THE INVENTION

Figure 1:
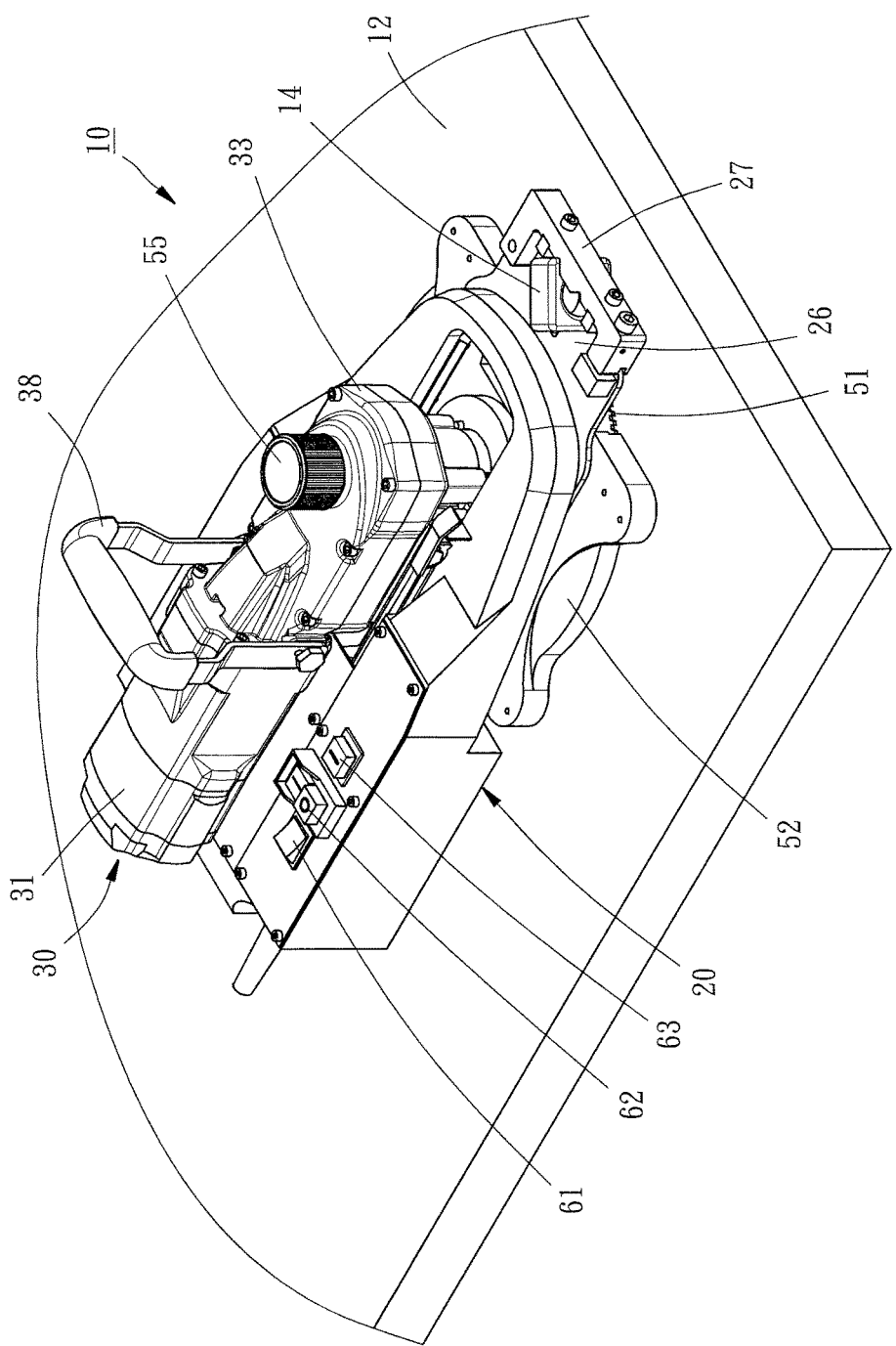
FIG. 1 is a perspective view of the horizontal sawing machine in the first embodiment of the present invention.
Figure 2:
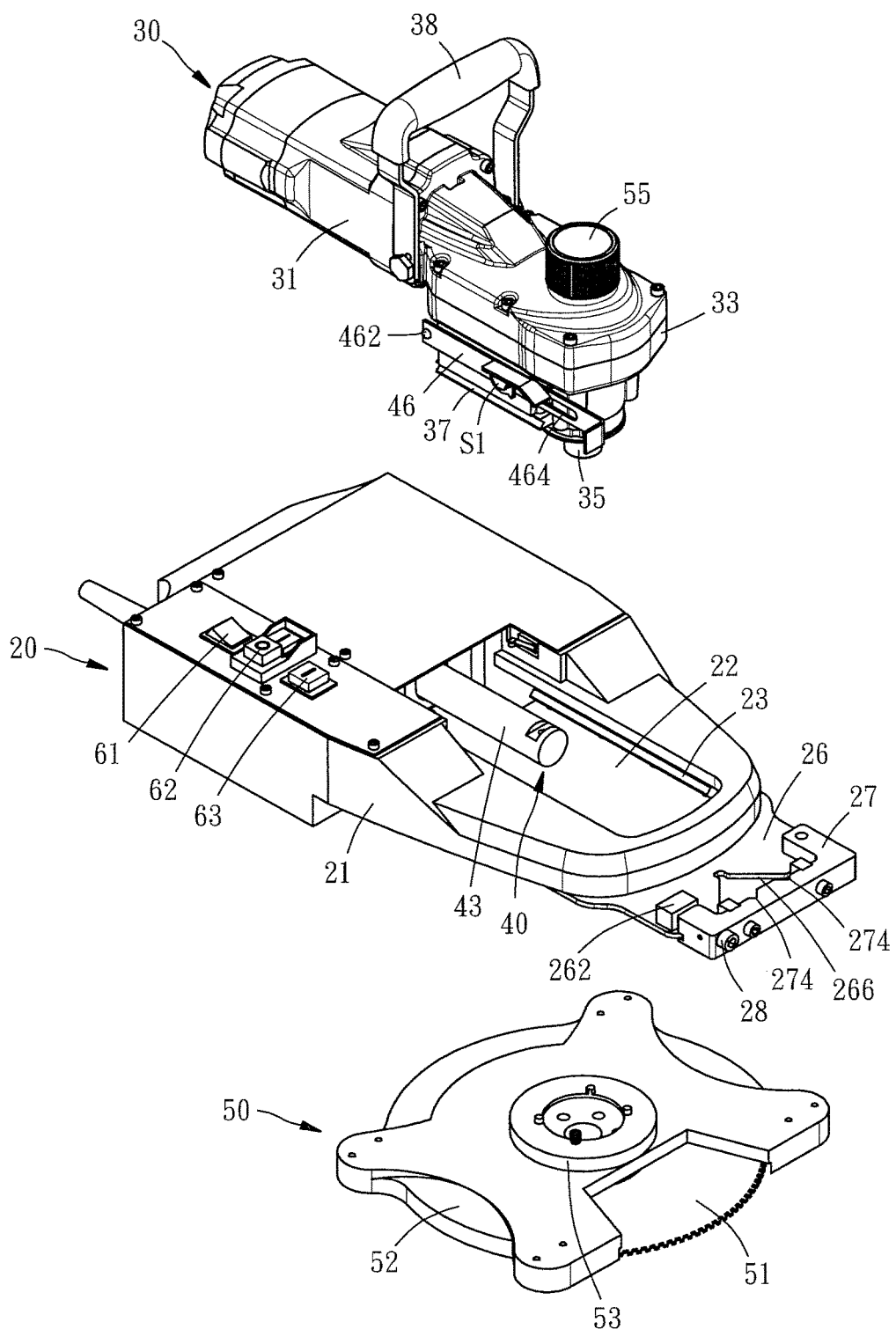
FIG. 2 is a partially exploded perspective view of the horizontal sawing machine in the first embodiment of the invention.

Referring to FIG. 1 and FIG. 2, the horizontal sawing machine 10 in the first embodiment of the present invention includes a support unit 20, a driving unit 30, a displacement unit 40, and a sawing unit 50.

Figure 3:
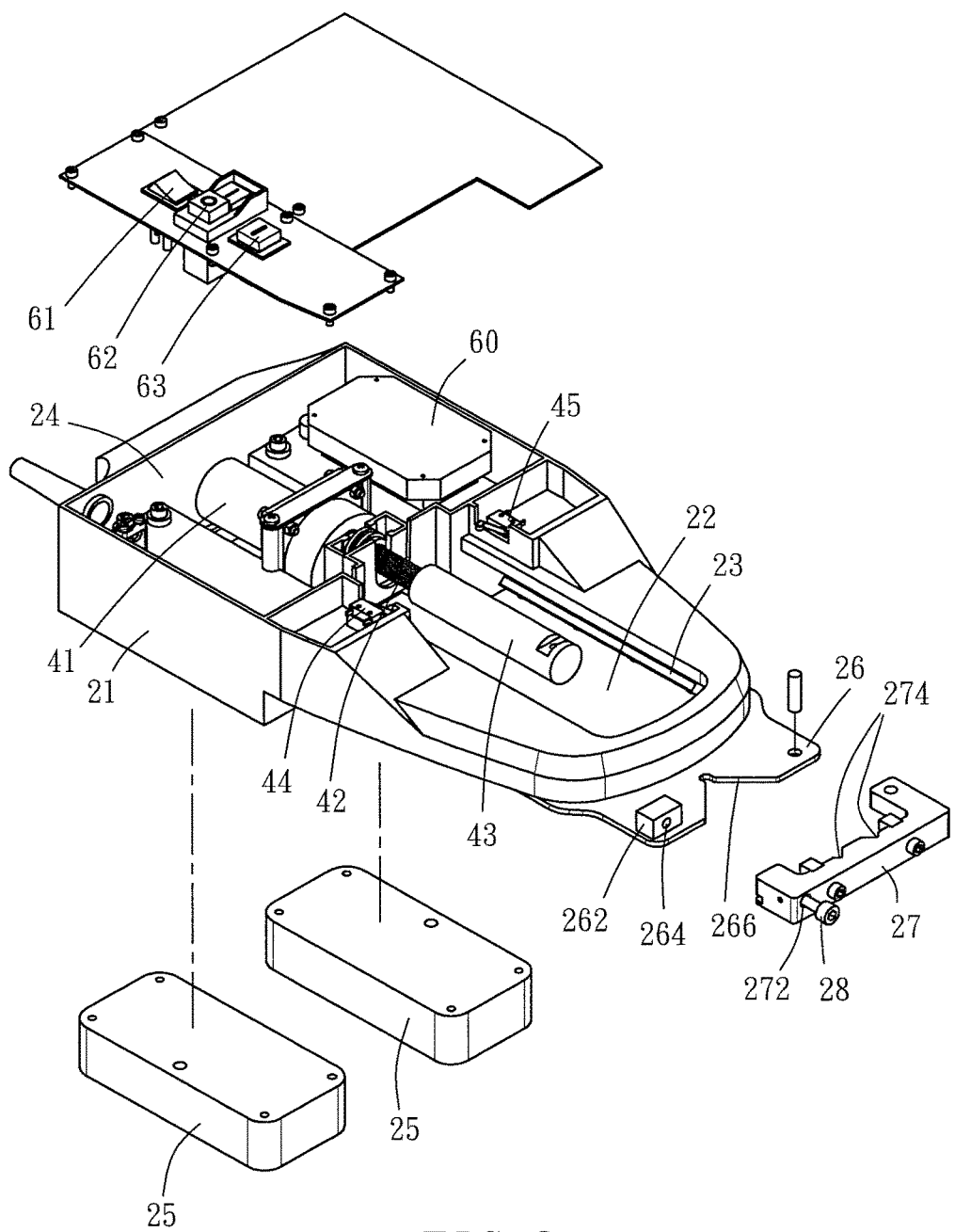
FIG. 3 is a partially exploded perspective view of the support unit of the horizontal sawing machine in the first embodiment of the invention.

As shown in FIG. 2 and FIG. 3, the support unit 20 has a slide rail base 21. The front half of the slide rail base 21 has a slide channel 22 extending through the top and bottom sides of the slide rail base 21. The slide rail base 21 also has a pair of stationary slide rails 23 respectively provided on two opposite lateral sides of the slide channel 22. The stationary slide rails 23 extend in a direction parallel to the direction in which the slide channel 22 extends. The rear half of the slide rail base 21 has a receiving room 24, in which a control box 60 is provided. The top side of the rear half of the slide rail base 21 is provided with a power switch 61, an electromagnetic switch 62, and a control switch 63 to be operated by the user. The bottom side of the rear half of the slide rail base 21 is provided with two electromagnets 25. When supplied with electricity, the electromagnets 25 can fix the slide rail base 21 to the surface of a workpiece 12 by magnetic attraction to ensure sawing stability.

The support unit 20 further has a first positioning member 26, a second positioning member 27, and a locking screw 28. The first positioning member 26 is fixed at the front end of the slide rail base 21. One end of the first positioning member 26 is pivotally connected to one end of the second positioning member 27. The opposite end of the first positioning member 26 has a fixing block 262 and a locking screw hole 264 in the fixing block 262. The opposite end of the second positioning member 27 has a through hole 272. The locking screw 28 extends through the through hole 272 of the second positioning member 27 and is threadedly provided in the locking screw hole 264 of the first positioning member 26 to lock the first and the second positioning members 26, 27 together. The side of the first positioning member 26 that faces the second positioning member 27 (i.e., the outer side of the first positioning member 26) has a first positioning notch 266. The side of the second positioning member 27 that faces the first positioning member 26 (i.e., the inner side of the second positioning member 27) has two spaced-apart second positioning notches 274. The first and the second positioning notches 266, 274 are all V-shaped.

Figure 4:
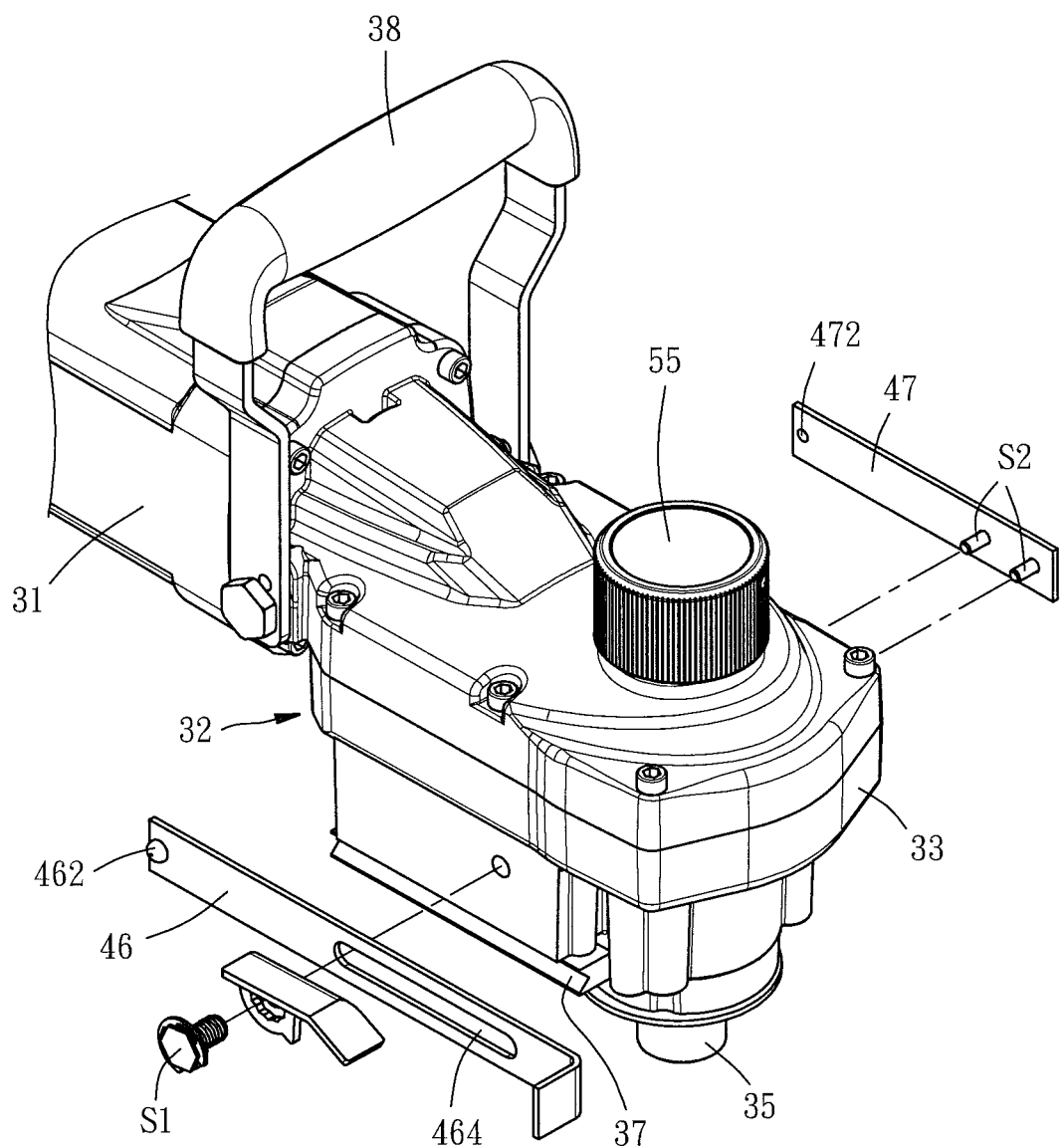
FIG. 4 is a partially exploded perspective view of the displacement unit of the horizontal sawing machine in the first embodiment of the invention.
Figure 5:
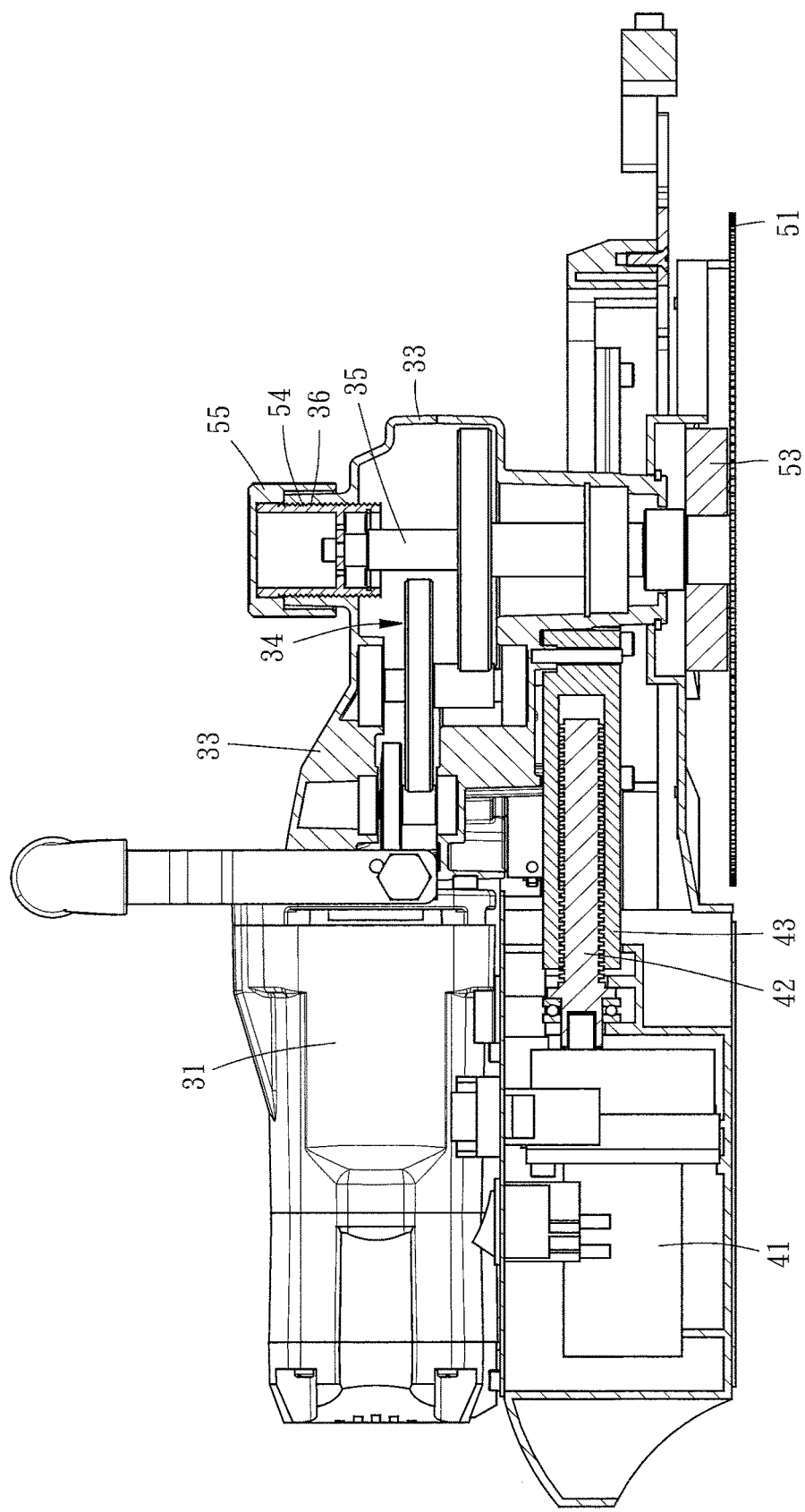
FIG. 5 is a sectional view of the horizontal sawing machine in the first embodiment of the invention.

As shown in FIG. 4 and FIG. 5, the driving unit 30 has a driving motor 31 and a reducing gear box 32. The driving motor 31 is electrically connected to the control box 60. The reducing gear box 32 has a box body 33, a reducing gear set 34 provided in the box body 33 and connected to the driving motor 31, and an output shaft 35 connected to the reducing gear set 34. The top end of the output shaft 35 corresponds to an adjusting screw hole 36 of the box body 33. The bottom end of the output shaft 35 is in the slide channel 22 of the slide rail base 21 of the support unit 20. Moreover, the axial direction of the output shaft 35 is perpendicular to the direction in which the slide channel 22 extends. The driving unit 30 further has two oppositely disposed movable slide rails 37 and a handle 38. The movable slide rails 37 are respectively provided on two opposite lateral sides of the box body 33 of the reducing gear box 32 and are respectively engaged with the stationary slide rails 23 of the support unit 20 so that the driving unit 30 can be moved forward and backward along the slide channel 22 with respect to the support unit 20. The handle 38 is connected to the outer periphery of the box body 33 of the reducing gear box 32, allowing the user to carry the horizontal sawing machine 10 with ease.

As shown in FIG. 3 to FIG. 5, the displacement unit 40 has a displacement motor 41, a threaded rod 42, and a threaded tube 43. The displacement motor 41 is provided in the receiving room 24 of the slide rail base 21 and is electrically connected to the control box 60. The axial direction of the threaded rod 42 is parallel to the direction in which the slide channel 22 extends. One end of the threaded rod 42 is connected to the displacement motor 41 in order for the displacement motor 41 to drive the threaded rod 42 into rotation. The opposite end of the threaded rod 42 is in the slide channel 22 of the slide rail base 21. The threaded tube 43 is threadedly provided on the threaded rod 42 and has one end connected to the box body 33 of the reducing gear box 32. When the threaded rod 42 is rotated, the threaded tube 43 is moved forward or backward along the axial direction of the threaded rod 42 and thereby moves the entire driving unit 30 through the reducing gear box 32.

As shown in FIG. 2 and FIG. 5, the sawing unit 50 lies under the slide rail base 21 of the support unit 20 and has a saw blade 51, a protective cover 52, and a saw blade mount 53. The protective cover 52 covers a portion of the saw blade 51 and keeps the saw blade 51 only partially exposed lest the user be cut by the saw blade 51. The saw blade mount 53 is provided at the center of the protective cover 52 and is connected between the output shaft 35 of the reducing gear box 32 and the saw blade 51 in order for the driving unit 30 to drive the saw blade 51 into rotation and for the sawing unit 50 to move forward and backward along with the driving unit 30.

As shown in FIG. 5, the sawing unit 50 further has an adjusting screw 54 and a knob 55. The adjusting screw 54 is threadedly provided in the adjusting screw hole 36 of the box body 33 of the reducing gear box 32 and is mounted on the top end of the output shaft 35 of the reducing gear box 32. The knob 55 is mounted on the adjusting screw 54 and is configured to rotate the adjusting screw 54. When turned, the knob 55 drives the adjusting screw 54 into rotation, and the rotating adjusting screw 54 moves the output shaft 35 upward or downward in the axial direction of the output shaft 35 and thereby adjusts the height of the sawing unit 50.

Figure 6:
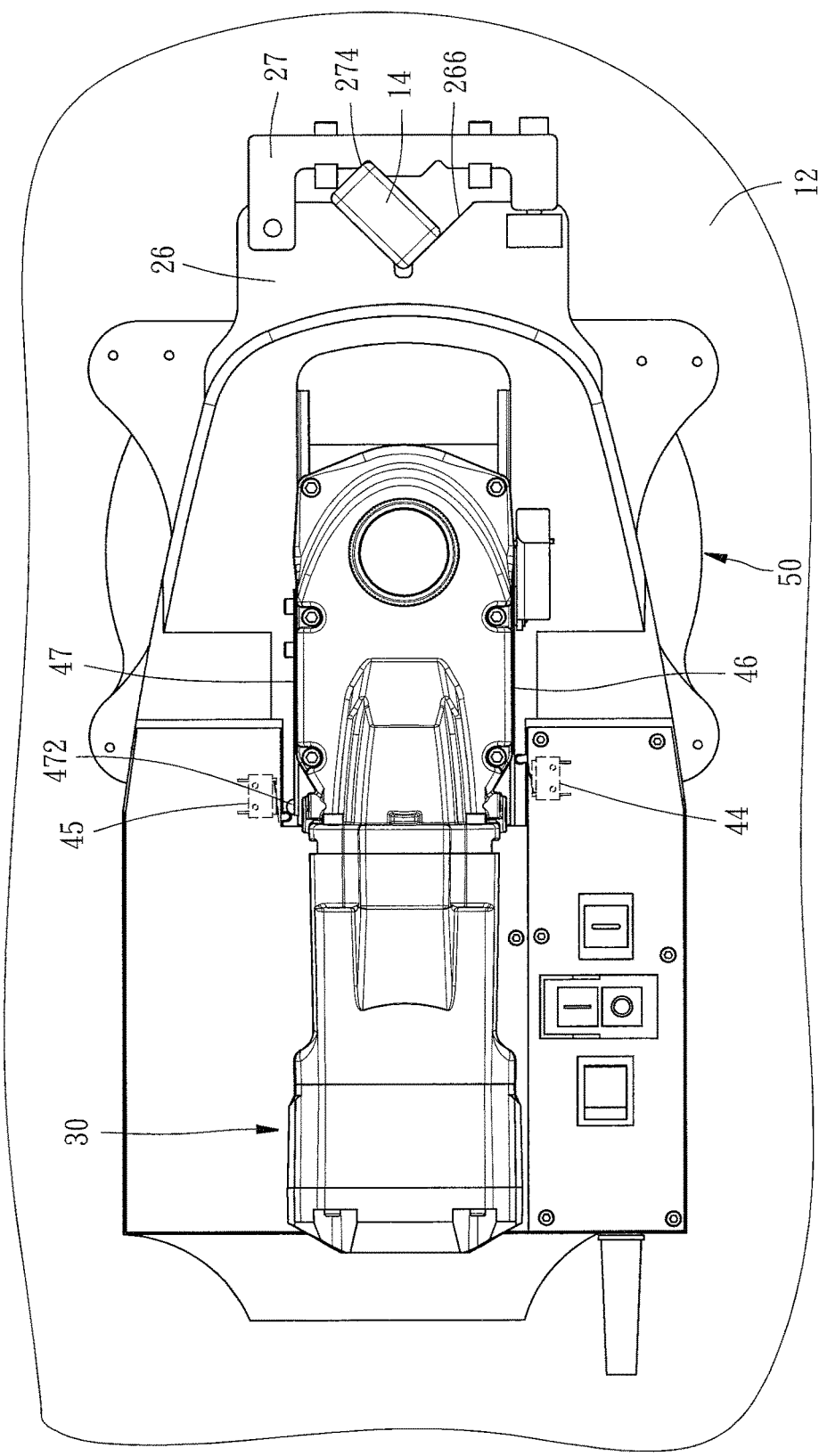
FIG. 6 is a top view of the horizontal sawing machine in the first embodiment of the invention, showing the driving unit at the rear dead point.
Figure 7:
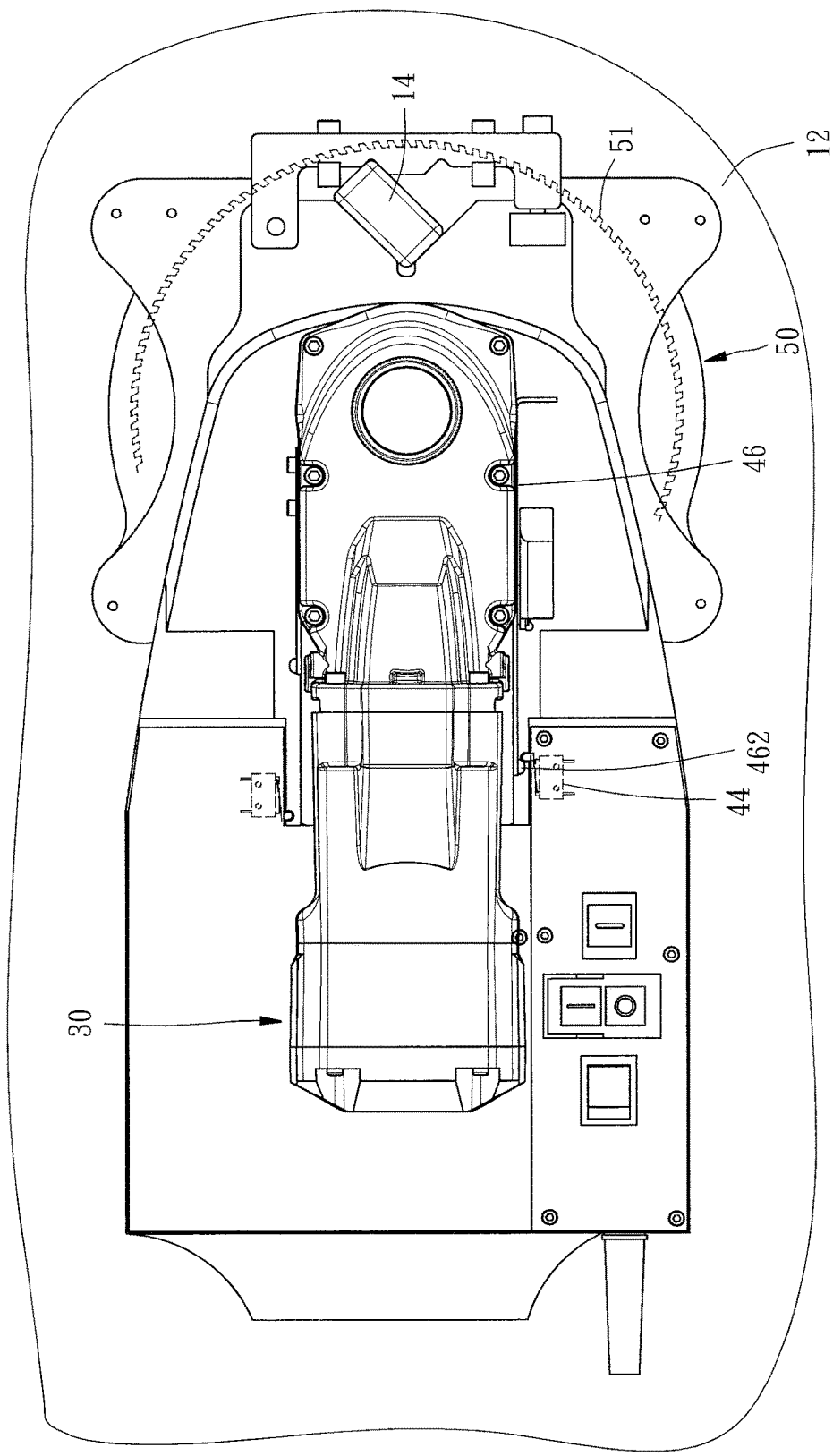
FIG. 7 is similar to FIG. 6 but shows the driving unit at the front dead point.

Before sawing, the slide rail base 21 of the support unit 20 is placed on the surface of the workpiece 12 (e.g., a steel plate), and then the locking screw 28 is loosened, allowing the second positioning member 27 to be opened, or pivoted outward, with respect to the first positioning member 26, and the to-be-sawed portion 14 of the workpiece 12 to be placed between the first and the second positioning members 26, 27. After that, the second positioning member 27 is closed, and the locking screw 28, tightened such that the to-be-sawed portion 14 is engaged in the first positioning notch 266 of the first positioning member 26 and one of the second positioning notches 274 of the second positioning member 27 and is kept from flying away when cut off. This technical feature enhances safety of operation. Next, the electromagnetic switch 62 is operated to supply electricity to the electromagnets 25, which secure the support unit 20 to the surface of the workpiece 12 by magnetic attraction to ensure stability of sawing. Once the support unit 20 is secured, the control switch 63 is operated to activate the driving motor 31 and the displacement motor 41. The driving motor 31 rotates the saw blade 51 while the driving unit 30, driven by the threaded tube 43 as a whole, moves the entire sawing unit 50 forward toward the to-be-sawed portion 14 of the workpiece 12, as shown in FIG. 6 and FIG. 7, until the sawing operation is completed. When sawing is done, the displacement motor 41 is rotated in reverse so that the threaded tube 43 moves the entire sawing unit 50 backward to its initial position. The driving motor 31 and the displacement motor 41 are then turned off by operating the control switch 63.

To provide additional protection through position limitation, the displacement unit 40 further has a first position-limiting switch 44, a second position-limiting switch 45, a first position-limiting member 46, and a second position-limiting member 47 for controlling the moving distance of the driving unit 30 and the sawing unit 50. As shown in FIG. 3, FIG. 6, and FIG. 7, the first and the second position-limiting switches 44, 45 are provided on the slide rail base 21, lie respectively on two opposite lateral sides of the driving unit 30, and are separately and electrically connected to the control box 60. As shown in FIG. 4, FIG. 6, and FIG. 7, the first position-limiting member 46 is fastened to the box body 33 of the reducing gear box 32 by a first screw S1 and corresponds to the first position-limiting switch 44. The first position-limiting member 46 has a slot 464, and the first screw S1 is passed through the slot 464 so that the first position-limiting member 46 can be adjusted in position with respect to the first position-limiting switch 44 in the direction in which the driving unit 30 is moved. The rear end of the first position-limiting member 46 has a first position-limiting protuberance 462 for triggering the first position-limiting switch 44. The second position-limiting member 47 is fixed to the box body 33 of the reducing gear box 32 by two second screws S2 and corresponds to the second position-limiting switch 45. The rear end of the second position-limiting member 47 has a second position-limiting protuberance 472 for triggering the second position-limiting switch 45.

Referring to FIG. 7, as soon as the driving unit 30 is moved forward to a position where the first position-limiting switch 44 is triggered by the first position-limiting protuberance 462 of the first position-limiting member 46, the control box 60 stops the displacement motor 41 according to a signal sent by the first position-limiting switch 44. The driving unit 30, therefore, stops moving forward and is at the front dead point. Similarly, referring to FIG. 6, as soon as the driving unit 30 is moved backward to a position where the second position-limiting switch 45 is triggered by the second position-limiting protuberance 472 of the second position-limiting member 47, the control box 60 stops the displacement motor 41 according to a signal sent by the second position-limiting switch 45. As a result, the driving unit 30 stops moving backward and is at the rear dead point. In other words, the user can precisely control the moving distance of the driving unit 30 and the sawing unit 50 through collaboration between the first and the second position-limiting members 46, 47 and the first and the second position-limiting switches 44, 45, lest the sawing unit 50 move more than the predetermined distance and cause danger in operation. Besides, the user may adjust the position of the first position-limiting member 46 and hence the distance between the first position-limiting protuberance 462 of the first position-limiting member 46 and the first position-limiting switch 44 according to practical needs, in order to adjust the moving distance of the driving unit 30 and the sawing unit 50 properly.

In summary of the above, the horizontal sawing machine 10 of the present invention is configured for horizontal movement, allowing the user to operate the saw blade 51 and complete the sawing operation with ease. Compared with the prior art, the present invention not only saves time and labor, but also reduces the risks associated with sawing.

Figure 8:
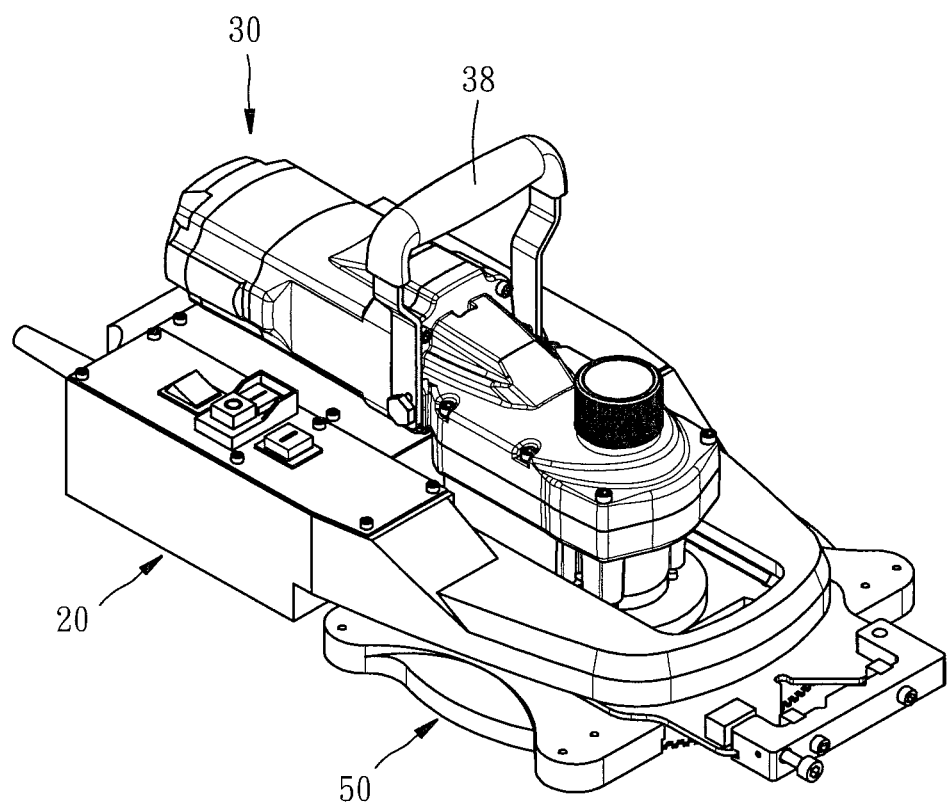
FIG. 8 is a perspective view of the horizontal sawing machine in the second embodiment of the invention.
Figure 9:
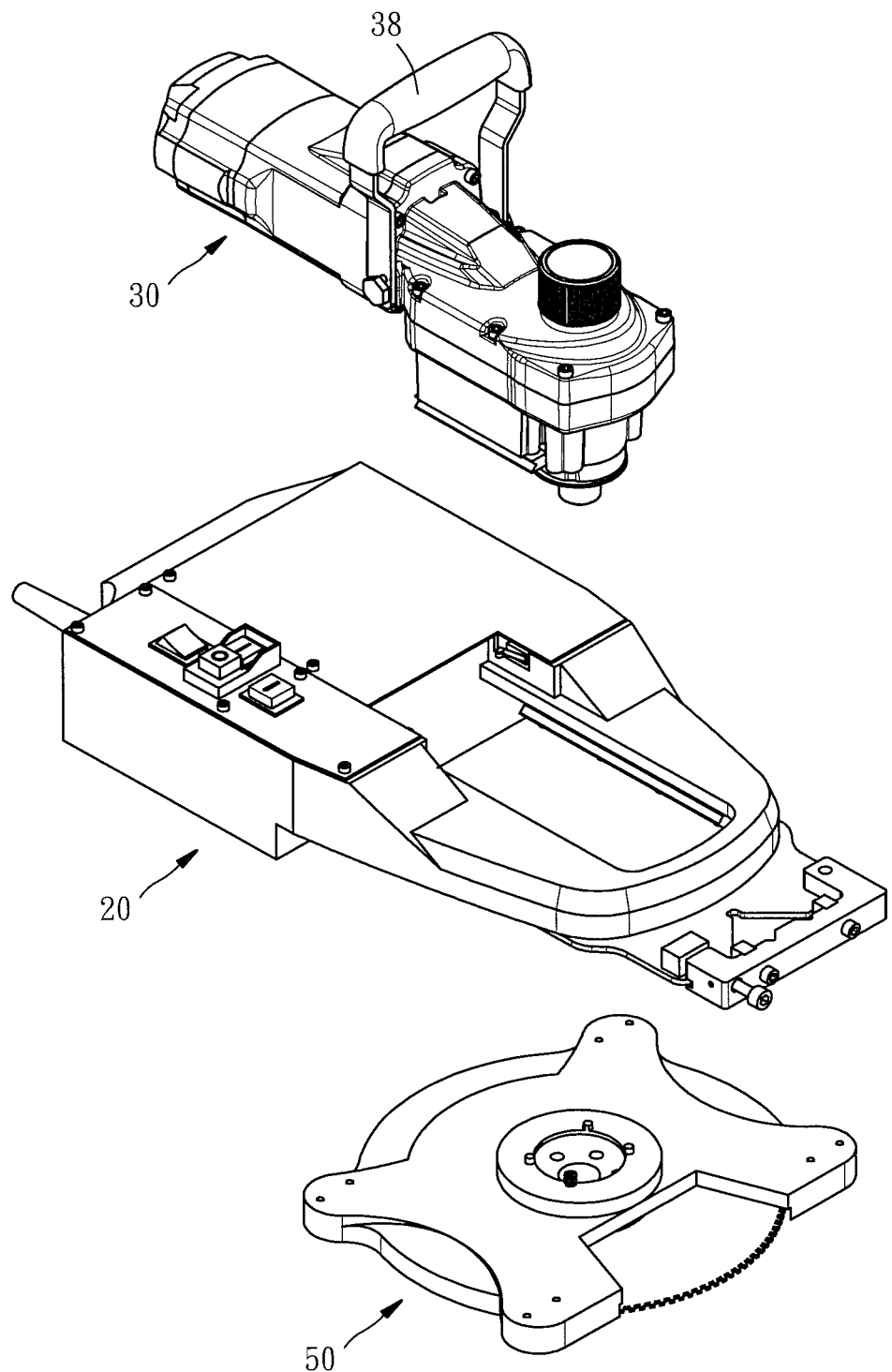
FIG. 9 is a partially exploded perspective view of the horizontal sawing machine in the second embodiment of the invention.

It is worth mentioning that the displacement unit 40 provided in the first embodiment to enable automated simultaneous movement of the driving unit 30 and the sawing unit 50 may be dispensed with. In the second embodiment of the present invention as shown in FIG. 8 and FIG. 9, the displacement unit 40 has been omitted such that, once the support unit 20 is secured in place, the user has to hold the handle 38 with both hands in order to move the sawing unit 50 manually during the sawing operation. Sawing can nevertheless be completed both rapidly and safely with such manual operation.

What is claimed is:

1. A horizontal sawing machine, comprising:
    a support unit having a slide rail base and two stationary slide rails, wherein the slide rail base has a slide channel extending through a top side and a bottom side of the slide rail base, and the two stationary slide rails are oppositely disposed on the slide rail base, are located on two opposite lateral sides of the slide channel respectively, and extend in a direction parallel to a direction in which the slide channel extends;
    a driving unit having a driving motor, a reducing gear box, and two movable slide rails, wherein the driving motor is located above the slide rail base of the support unit, the reducing gear box is connected to the driving motor and has an output shaft extending into the slide channel of the slide rail base of the support unit, and the two movable slide rails are oppositely disposed on an outer periphery of the reducing gear box and are respectively and slidably engaged with the stationary slide rails of the support unit in order for the driving unit to move with respect to the support unit; and
    a sawing unit provided under the slide rail base of the support unit and having a saw blade mount and a saw blade, wherein the saw blade mount is connected between the output shaft of the reducing gear box of the driving unit and the saw blade in order for the saw blade to move along with the driving unit and be driven to rotate by the driving unit.

2. The horizontal sawing machine of claim 1, wherein the support unit further has a first positioning member, a second positioning member, and a locking screw; the first positioning member is fixed at an end of the slide rail base, has an end pivotally connected to an end of the second positioning member, and has an opposite end having a locking screw hole; the second positioning member has an opposite end having a through hole; and the locking screw extends through the through hole of the second positioning member and is threadedly provided in the locking screw hole of the first positioning member.

3. The horizontal sawing machine of claim 2, wherein the first positioning member has a side facing the second positioning member and having a first positioning notch, and the second positioning member has a side facing the first positioning member and having a second positioning notch.

4. The horizontal sawing machine of claim 3, wherein both the first positioning notch and the second positioning notch are V-shaped.

5. The horizontal sawing machine of claim 1, further comprising a displacement unit, wherein the displacement unit has a displacement motor, a threaded rod, and a threaded tube; the displacement motor is provided in the slide rail base; the threaded rod has an axial direction parallel to the direction in which the slide channel extends, has an end connected to the displacement motor, and has an opposite end in the slide channel of the slide rail base; and the threaded tube is threadedly provided on the threaded rod and has an end connected to the reducing gear box of the driving unit.

6. The horizontal sawing machine of claim 5, wherein the displacement unit further has a first position-limiting switch, a second position-limiting switch, a first position-limiting member, and a second position-limiting member; the first and the second position-limiting switches are oppositely disposed on the slide rail base and are separately and electrically connected to the displacement motor; the first position-limiting member is provided on a lateral side of the reducing gear box, is displaceable in a direction in which the driving unit is moved, and has a first position-limiting protuberance such that the displacement motor stops operation when the first position-limiting protuberance triggers the first position-limiting switch; and the second position-limiting member is fixed on an opposite lateral side of the reducing gear box and has a second position-limiting protuberance such that the displacement motor stops operation when the second position-limiting protuberance triggers the second position-limiting switch.

7. The horizontal sawing machine of claim 1, wherein the support unit further has an electromagnet provided on the bottom side of the slide rail base to fix the slide rail base to a workpiece.

8. The horizontal sawing machine of claim 1, wherein the reducing gear box has a top side having an adjusting screw hole, the sawing unit further has an adjusting screw and a knob, the adjusting screw is threadedly provided in the adjusting screw hole of the reducing gear box and is mounted on a top end of the output shaft of the reducing gear box, and the knob is mounted on the adjusting screw in order to drive the adjusting screw into rotation.

9. The horizontal sawing machine of claim 1, wherein the sawing unit further has a protective cover covering the saw blade.

* * * * *